US012687958B2

(12) United States Patent
Wichary et al.

(10) Patent No.: US 12,687,958 B2
(45) Date of Patent: Jul. 21, 2026

(54) SYSTEM AND METHOD FOR IMPLEMENTING DESIGN SYSTEM TO PROVIDE PREVIEW OF CONSTRAINT CONFLICTS

(71) Applicant: Figma, Inc., San Francisco, CA (US)

(72) Inventors: Marcin Wichary, San Francisco, CA (US); Nikolas Klein, San Francisco, CA (US)

(73) Assignee: Figma, Inc., San Francisco, CA (US)

( * ) Notice: Subject to any disclaimer, the term of this patent is extended or adjusted under 35 U.S.C. 154(b) by 0 days.

(21) Appl. No.: 18/598,418

(22) Filed: Mar. 7, 2024

(65) Prior Publication Data

US 2024/0211123 A1     Jun. 27, 2024

Related U.S. Application Data

(63) Continuation of application No. 18/139,299, filed on Apr. 25, 2023, now Pat. No. 12,026,361, which is a continuation of application No. 17/570,200, filed on Jan. 6, 2022, now Pat. No. 11,681,423, which is a continuation of application No. 16/682,982, filed on Nov. 13, 2019, now Pat. No. 11,269,501.

(51) Int. Cl.
*G06F 3/04845*     (2022.01)
*G06F 3/04842*     (2022.01)
*H04L 67/14*     (2022.01)

(52) U.S. Cl.
CPC ...... *G06F 3/04845* (2013.01); *G06F 3/04842* (2013.01); *H04L 67/14* (2013.01)

(58) Field of Classification Search
CPC ... G06F 3/04845; G06F 3/04842; H04L 67/14
See application file for complete search history.

(56) References Cited

U.S. PATENT DOCUMENTS

| | | | |
|---|---|---|---|
| 7,752,559 B1 | 7/2010 | Szpak | |
| 8,312,416 B2 | 11/2012 | Freund | |
| 8,370,757 B2 | 2/2013 | Tinari | |
| 8,612,849 B2 | 12/2013 | Boreham | |
| 9,430,229 B1 | 8/2016 | Zijst | |
| 9,772,682 B1 | 9/2017 | Meenakshisundaram | |
| 10,114,733 B1 | 10/2018 | Varghese | |
| 10,181,059 B1 | 1/2019 | Brewton | |
| 10,268,525 B2 | 4/2019 | Beckett | |

(Continued)

FOREIGN PATENT DOCUMENTS

| | | |
|---|---|---|
| EP | 0576178 | 12/1993 |
| EP | 2775397 A2 | 9/2014 |

(Continued)

OTHER PUBLICATIONS

International Search Report and The Written Opinion of The International Searching Authority mailed Jan. 17, 2021, for related PCT/US2020/060300 filed Nov. 12, 2020, 13 pages.

(Continued)

*Primary Examiner* — Sherrod L Keaton
(74) *Attorney, Agent, or Firm* — Squire Patton Boggs LLP; Sarah Mirza

(57) ABSTRACT

A computing system that can operate to implement an interactive graphic design system that enables users to preview and resolve input actions that cause conflict with predefined constraints.

20 Claims, 10 Drawing Sheets

(56) References Cited

U.S. PATENT DOCUMENTS

| | | | | | |
|---|---|---|---|---|---|
| 10,997,217 | B1 | 5/2021 | Nielsen | | |
| 11,635,889 | B1* | 4/2023 | Swanson | ............... | G06F 3/0481 |
| | | | | | 715/764 |
| 2002/0032554 | A1 | 3/2002 | Nakagawa | | |
| 2005/0094206 | A1 | 5/2005 | Tonisson | | |
| 2008/0282188 | A1 | 11/2008 | Hays | | |
| 2012/0124492 | A1* | 5/2012 | Taron | ...................... | G06F 9/451 |
| | | | | | 715/762 |
| 2013/0120368 | A1 | 5/2013 | Miller | | |
| 2013/0232403 | A1 | 9/2013 | Abrahami | | |
| 2014/0207506 | A1* | 7/2014 | Palmert | ................. | G06F 16/248 |
| | | | | | 705/7.15 |
| 2014/0310660 | A1 | 10/2014 | Rosen | | |
| 2014/0351110 | A1 | 11/2014 | Lidor | | |
| 2015/0092228 | A1 | 4/2015 | Okabyashi | | |
| 2015/0105875 | A1 | 4/2015 | Tran | | |
| 2015/0160838 | A1 | 6/2015 | Shirabe | | |
| 2016/0048388 | A1 | 2/2016 | Eksten | | |
| 2016/0246899 | A1* | 8/2016 | Hirschtick | .............. | G06F 30/00 |
| 2017/0046317 | A1 | 2/2017 | Geva | | |
| 2017/0199652 | A1 | 7/2017 | Campbell | | |
| 2017/0337321 | A1 | 11/2017 | Hoford | | |
| 2018/0173406 | A1 | 6/2018 | Hill | | |
| 2019/0114817 | A1 | 4/2019 | Kerr | | |
| 2019/0325626 | A1 | 10/2019 | Tao | | |
| 2019/0369822 | A1 | 12/2019 | Tzeng | | |
| 2020/0233624 | A1 | 7/2020 | Peng | | |
| 2021/0141515 | A1 | 5/2021 | Wichary | | |
| 2021/0247967 | A1 | 8/2021 | Wichary | | |
| 2022/0083316 | A1 | 3/2022 | Andersson | | |
| 2022/0129142 | A1 | 4/2022 | Wichary | | |
| 2022/0156422 | A1 | 5/2022 | Kuwamoto | | |
| 2023/0418562 | A1 | 12/2023 | Andersson | | |
| 2024/0012548 | A1 | 1/2024 | Chui | | |

FOREIGN PATENT DOCUMENTS

| | | |
|---|---|---|
| EP | 3293619 | 3/2018 |
| EP | 3633472 A1 | 4/2020 |
| WO | WO-2009/132444 A1 | 11/2009 |
| WO | WO-2021/097141 | 5/2021 |
| WO | WO-2021/159079 | 8/2021 |
| WO | WO-2022/061027 | 3/2022 |
| WO | WO-2022/109200 | 5/2022 |

OTHER PUBLICATIONS

International Search Report and The Written Opinion of The International Searching Authority mailed May 21, 2021, for related PCT/US2021/017093 filed Feb. 8, 2021, 16 pages.
Tutorialspoint.com: "Microsoft Visio Themes and Styles", Nov. 30, 2018, XP055801565, Retrieved from the Internet: URL: https://web.archive.org/web/20181130054605/https://www.tutorialspoint.com/microsoft_visio/microsoft_visio_themes_styles.htm [retrieved on May 5, 2021]; 3 pages.
International Search Report and The Written Opinion of The International Searching Authority mailed Dec. 22, 2021, for related PCT/US2021/050734 filed Sep. 16, 2021, 66 pages.
International Search Report and The Written Opinion of The International Searching Authority mailed Feb. 23, 2022, for related PCT/US2021/059987 filed Nov. 18, 2021, 12 pages.
IBM: "IBM VisualAge for Java, Version 3.5—Visual Compisition", 2000, pp. 1-253, XP055890198, Retrieved from the Internet: URL:http://www.inf.fu-berlin.de/inst/ag-db/software/VAJ_PDF/jvbpdf.pdf [retrieved onFeb. 10, 2022] section titled "Layout managers in visual composition" at pp. 14-17 section titled "Setting a layout manager during visual composition" at page 60 first paragraph of the section titled "Null Layout" at p. 17.
Paper by WeTransfer—Simple Sketch App, "Creativity at your fingertips" URL:https://web.archive.org/web/20220121205009/https://wetransfer.com/paper, 9 pages
Jarzabek et al, "XVCL: XML-based Variant Configuration Language", IEEE, pp. 1-2 (Year: 2003).
Kriouile et al, "Towards Flexible and Reusable SaaS for Multitenancy", IEEE, pp 1-7 (Year: 2014)

* cited by examiner

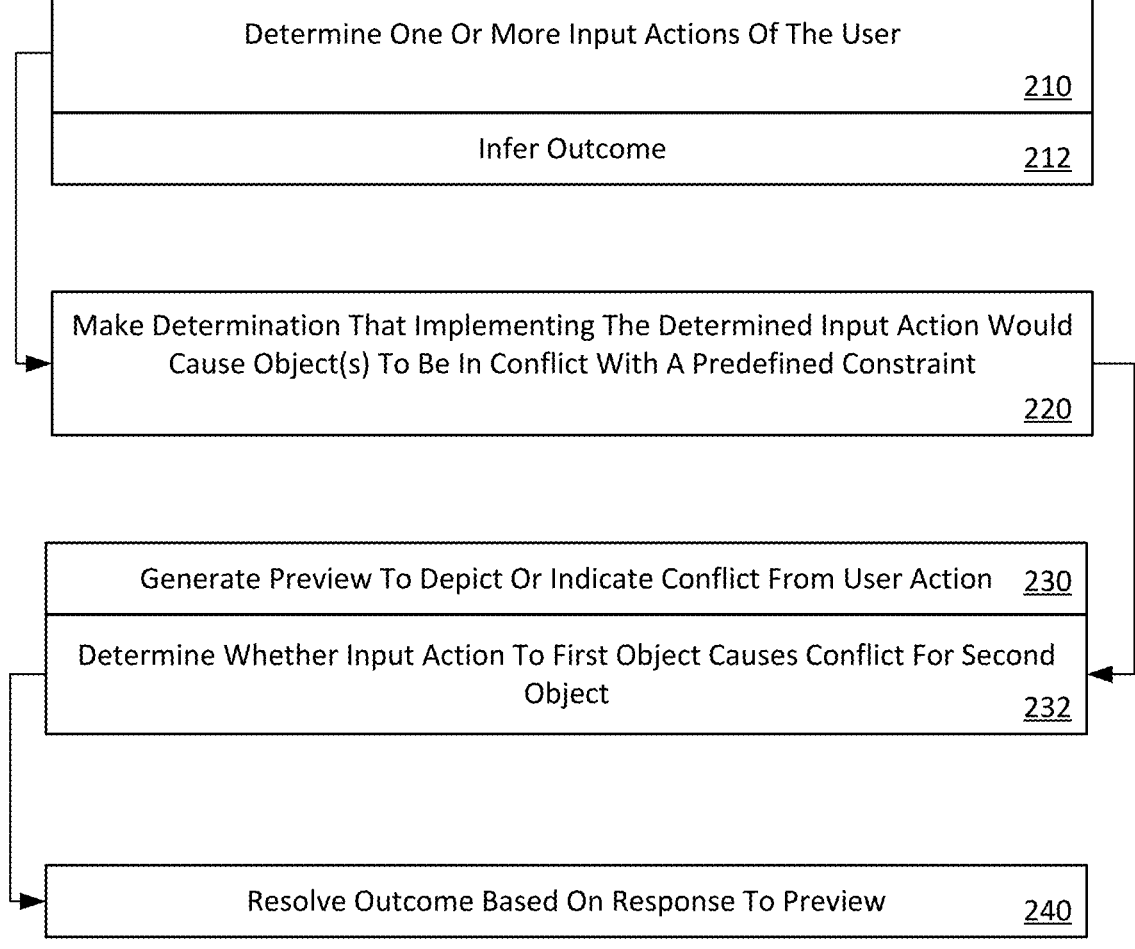

Determine One Or More Input Actions Of The User

210

Infer Outcome     212

Make Determination That Implementing The Determined Input Action Would Cause Object(s) To Be In Conflict With A Predefined Constraint

220

Generate Preview To Depict Or Indicate Conflict From User Action     230

Determine Whether Input Action To First Object Causes Conflict For Second Object     232

Resolve Outcome Based On Response To Preview     240

FIG. 2

SYSTEM AND METHOD FOR IMPLEMENTING DESIGN SYSTEM TO PROVIDE PREVIEW OF CONSTRAINT CONFLICTS

RELATED APPLICATIONS

This application is a continuation of U.S. patent application Ser. No. 18/139,299, filed Apr. 25, 2023; which is a continuation of U.S. patent application Ser. No. 17/570,200, filed Jan. 6, 2022, now U.S. Pat. No. 11,681,423; which is a continuation of U.S. patent application Ser. No. 16/682,982, filed Nov. 13, 2019, now U.S. Pat. No. 11,269,501; all of the aforementioned applications being hereby incorporated by reference in their respective entireties.

TECHNICAL FIELD

Examples described herein relate to a network computing system and method to implement a design system.

BACKGROUND

Software design tools have many forms and applications. In the realm of application user interfaces, for example, software design tools require designers to blend functional aspects of a program with aesthetics and even legal requirements, resulting in a collection of pages which form the user interface of an application. For a given application, designers often have many objectives and requirements that are difficult to track.

BRIEF DESCRIPTION OF THE DRAWINGS

FIG. 2 illustrates a method for updating a design interface under edit, according to one or more examples.

DETAILED DESCRIPTION

Figure 1A:
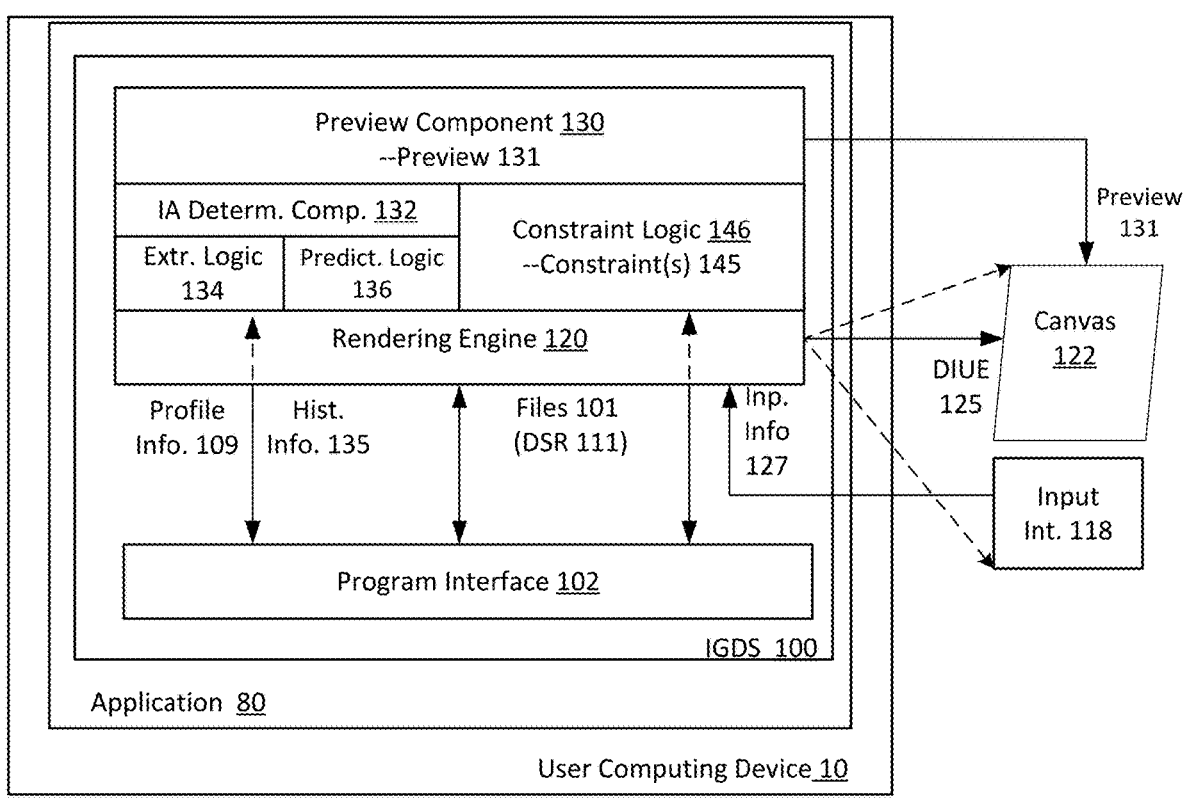
FIG. 1A illustrates an interactive graphic design system for a computing device of a user, according to one or more examples.

Examples include a computing system that can operate to implement an interactive graphic design system that enables users to preview and resolve input actions that cause conflict with predefined constraints. In some examples, the computing system temporarily depicts one or more objects in a conflicted state with respect to a predefined constraint, as a result of an input action that is inferred or determined from the user's input.

In examples, a computing system is configured to implement an interactive graphic design system for designer, such as user interface designers ("UI designers"), web designers, and web developers. Among other advantages, examples as described enable such users to preview outcomes of their input actions, in order show when the input actions have unwanted outcomes. Through previews, the user can avoid implementing design inputs that could otherwise have outcomes where predefined constraints for a particular design are violated.

According to some examples, a computing device operates to detect a user of an account specifying any one of multiple different input actions for creating objects of different types on a canvas. Based on the user input, the computing device determines an input action to affect a first object. The computing device further determines that the input action, when implemented on the first object independent of a second object, causes the second object to be in conflict with a predefined constraint. The computing device provides a temporary preview that depicts an outcome of implementing the input action on the first object and the second objects.

Still further, in some examples, a network computer system is provided to include memory resources store a set of instructions, and one or more processors are operable to communicate the set of instructions to a plurality of user devices. The set of instructions can be communicated to user computing devices, in connection with the user computing devices being operated to render a corresponding design under edit on a canvas, where the design under edit can be edited by user input that is indicative of any one of multiple different input actions. The set of instructions can be executed on the computing devices to cause each of the computing devices to determine one or more input actions to perform based on user input. The instructions may further cause the user computing devices to implement the one or more input actions to modify the design under edit. For at least a first computing device, the instructions can be executed to cause the first computing device to determine the one or more input actions to perform by: (i) identifying a first input action that is indicated by the user input received on the first user device; (ii) determining that implementing the first input action would cause one or more objects to be in conflict with a predefined constraint of the corresponding design under edit; (iii) generating a preview, the preview depicting the one or more objects that would be in conflict with the constraint if the first input action is implemented; and (iv) resolving an outcome for the first input action based on a user response to the preview.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1A illustrates an interactive graphic design system for a computing device of a user, according to one or more examples. An interactive graphic design system ("IGDS") 100 can be implemented in any one of multiple different computing environments. For example, in some variations, the IGDS 100 can be implemented as a client-side application that executes on the user computing device 10 to provide functionality as described with various examples. In other examples, such as described below, the IGDS 100 can be implemented through use of a web-based application 80. As an addition or alternative, the IGDS 100 can be implemented as a distributed system, such that processes described with various examples execute on a network computer (e.g., server) and on the user device 10.

According to examples, the IGDS 100 can be implemented on a user computing device 10 to enable a corresponding user to design various types of interfaces using graphical elements. The IGDS 100 can include processes that execute as or through a web-based application 80 that is installed on the computing device 10. As described by various examples, web-based application 80 can execute scripts, code and/or other logic (the "programmatic components") to implement functionality of the IGDS 100. Additionally, in some variations, the IGDS 100 can be implemented as part of a network service, where web-based application 80 communicates with one or more remote computers (e.g., server used for a network service) to executes processes of the IGDS 100.

In some examples, web-based application 80 retrieves some or all of the programmatic resources for implementing the IGDS 100 from a network site. As an addition or alternative, web-based application 80 can retrieve some or all of the programmatic resources from a local source (e.g., local memory residing with the computing device 10). The web-based application 80 may also access various types of data sets in providing the IGDS 100. The data sets can correspond to files and libraries, which can be stored remotely (e.g., on a server, in association with an account) or locally.

In examples, the web-based application 80 can correspond to a commercially available browser, such as GOOGLE CHROME (developed by GOOGLE, INC.), SAFARI (developed by APPLE, INC.), and INTERNET EXPLORER (developed by the MICROSOFT CORPORATION). In such examples, the processes of the IGDS 100 can be implemented as scripts and/or other embedded code which web-based application 80 downloads from a network site. For example, the web-based application 80 can execute code that is embedded within a webpage to implement processes of the IGDS 100. The web-based application 80 can also execute the scripts to retrieve other scripts and programmatic resources (e.g., libraries) from the network site and/or other local or remote locations. By way of example, the web-based application 80 may execute JAVASCRIPT embedded in an HTML resource (e.g., webpage structured in accordance with HTML 5.0 or other versions, as provided under standards published by W3C or WHATWG consortiums). In some examples, the rendering engine 120 and/or other components may utilize graphics processing unit (GPU) accelerated logic, such as provided through WebGL (Web Graphics Library) programs which execute Graphics Library Shader Language (GLSL) programs that execute on GPUs.

According to examples, user of computing device 10 operates web-based application 80 to access a network site, where programmatic resources are retrieved and executed to implement the IGDS 100. In this way, the user may initiate a session to implement the IGDS 100 for purpose of creating and/or editing a design interface. In examples, the IGDS 100 includes a program interface 102, an input interface 118, and a rendering engine 120. The program interface 102 can include one or more processes which execute to access and retrieve programmatic resources from local and/or remote sources.

In an implementation, the program interface 102 can generate, for example, a canvas 122, using programmatic resources which are associated with web-based application 80 (e.g., HTML 5.0 canvas). As an addition or variation, the program interface 102 can trigger or otherwise cause the canvas 122 to be generated using programmatic resources and data sets (e.g., canvas parameters) which are retrieved from local (e.g., memory) or remote sources (e.g., from network service).

The program interface 102 may also retrieve programmatic resources that include an application framework for use with canvas 122. The application framework can include data sets which define or configure, for example, a set of interactive graphic tools that integrate with the canvas 122 and which comprise the input interface 118, to enable the user to provide input for creating and/or editing a design interface.

According to some examples, the input interface 118 can be implemented as a functional layer that is integrated with the canvas 122 to detect and interpret user input. The input interface 118 can, for example, use a reference of the canvas 122 to identify a screen location of a user input (e.g., 'click'). Additionally, the input interface 118 can interpret an input action of the user based on the location of the detected input (e.g., whether the position of the input indicates selection of a tool, an object rendered on the canvas, or region of the canvas), the frequency of the detected input in a given time period (e.g., double-click), and/or the start and end position of an input or series of inputs (e.g., start and end position of a click and drag), as well as various other input types which the user can specify (e.g., right-click, screen-tap, etc.) through one or more input devices. In this manner, the input interface 118 can interpret, for example, a series of inputs as a design tool selection (e.g., shape selection based on location of input), as well as inputs to define attributes (e.g., dimensions) of a selected shape.

Additionally, the program interface 102 can be used to retrieve, from local or remote sources, programmatic resources and data sets which include files 101 which comprise an active workspace for the user. The retrieved data sets can include one or more pages that include design elements which collectively form a design interface, or a design interface that is in progress. Each file 101 can include one or multiple data structure representations 111 which collectively define the design interface. The files 101 may also include additional data sets which are associated with the active workspace. For example, as described with some examples, the individual pages of the active workspace may be associated with a set of constraints 145. As an additional example, the program interface 102 can retrieve (e.g., from network service 152 (see FIG. 1B), from local memory, etc.) one or more types of profile information 109, such as user profile information which can identify past activities of the user of the computing device 10 when utilizing the IGDS 100. The profile information 109 can identify, for example, input types (or actions) of the user with respect to the page(s) of the active workspace, or more generally, input actions of the user in a prior time interval. In some variations, the profile information 109 can also identify historical or contextual information about individual design interfaces, as represented by corresponding data structure representations 111.

In examples, the rendering engine 120 uses the data structure representations 111 to render a corresponding DIUE 125 on the canvas 122, wherein the DIUE 125 reflects graphic elements and their respective attributes as provided with the individual pages of the files 101. The user can edit the DIUE 125 using the input interface 118. Alternatively, the rendering engine 120 can generate a blank page for the canvas 122, and the user can use the input interface 118 to generate the DIUE 125. As rendered, the DIUE 125 can include graphic elements such as a background and/or a set of objects (e.g., shapes, text, images, programmatic elements), as well as attributes of the individual graphic elements. Each attribute of a graphic element can include an attribute type and an attribute value. For an object, the types of attributes include, shape, dimension (or size), layer, type, color, line thickness, text size, text color, font, and/or other visual characteristics. Depending on implementation, the attributes reflect properties of two- or three-dimensional designs. In this way, attribute values of individual objects can define, for example, visual characteristics of size, color, positioning, layering, and content, for elements that are rendered as part of the DIUE 125.

In examples, individual design elements may also be defined in accordance with a desired run-time behavior. By way of example, some objects can be defined to have run-time behaviors that are either static or dynamic. The attributes of dynamic objects may change in response to predefined run-time events generated by the underlying application that is to incorporate the DIUE 125. Additionally, some objects may be associated with logic that defines the object as being a trigger for rendering or changing other objects, such as through implementation of a sequence or workflow. Still further, other objects may be associated with logic that provides the design elements to be conditional as to when they are rendered and/or their respective configuration or appearance when rendered. Still further, objects may also be defined to be interactive, where one or more attributes of the object may change based on user-input during the run-time of the application.

The input interface 118 can process at least some user inputs to determine input information 127, where the input information 127 indicates (i) an input action type (e.g., shape selection, object selection, sizing input, color selection), (ii) an object that is directly indicated by the input action (e.g., object being resized), (iii) a desired attribute that is to be altered by the input action, and/or (iv) a desired value for the attribute being altered. The rendering engine 120 can receive the input information 127, and the rendering engine 120 can implement changes indicated by the input information 127 to update the DIUE 125. When changes are implemented to the DIUE 125, the changes can also be reflected in the accompanying data structure representations 111 for the DIUE 125.

According to some examples, the rendering engine 120 includes input action determination logic 132 which can extrapolate, predict, infer or otherwise determine a desired outcome of a user for a given input or series of inputs. In examples, the rendering engine 120 can execute the input action determination logic 132 to interpret a series of inputs, as represented by the input information 127. The input information 127 can be correlated to an input action that is associated with a user intent (e.g., a desired set of attributes for one or more objects which may be impacted by the user input action). By way of illustration, the rendering engine 120 can execute the input action determination logic 132 to interpret a series of inputs coinciding with the user dragging a newly created or existing object along the canvas 122 as an input action, where an outcome of the input action is to provide that the location attributes that define the object in two or three dimensions are to coincide with a desired location on the canvas 122. Similarly, the rendering engine 120 can execute the input action determination logic 132 to interpret a series of inputs from the user (e.g., click and drag input) as an input action where the user intends to resize a dimension of the object to a particular value on the canvas 122.

In some variations, the input action determination logic 132 includes extrapolation logic 134 to extrapolate a position or other attribute of an input action, based on a sequence of inputs from the user that occur within a sufficiently short time frame to indicate the user performing a single action (e.g., continuous draft). The input action determination logic 132 can use the extrapolation logic 134 to determine, for example, a target or desired attribute value for a selected object based on corresponding attribute values of the user input, as reflected through the input information 127. In such examples, the determination can be made while the user is in the process of completing an input action.

As an addition or alternative, the input action determination logic 132 can include predictive logic 136 that predicts an outcome for a user's input action when the input action is initially detected (e.g., through analysis of the 127), and/or while the input action is in progress or otherwise determined to have not completed (e.g., user initiating a click and drag movement for an object). In some examples, the predictive logic 136 can predict a subsequent input action of the user (e.g., correspond to a user selection of an object or input tool), and/or an object or other graphical elements of the DIUE 125 that is to have a desired set of attributes.

According to examples, predictive logic 136 is developed based on historical information 135 of the user. For example, the predictive logic 136 can be developed based on recently performed actions of the user with respect to the DIUE 125, or with respect to other similar design interfaces which the user worked on in a relevant time period. As another addition or variation, the predictive logic 136 can be developed based on historical information 135 associated with the DIUE 125, including input actions of other users, either in prior sessions or concurrently with a current session of the user (e.g., see FIG. 1C). For example, the predictive logic 136 can implement one or more models which predict any one or more of (i) a type of input action the user intends to perform (e.g., resize, move, color, parent or reparent object to another object, etc.), (ii) an object that is to be created or modified by the input action of the user, and/or (iii) a desired set of attributes for an object that is that is directly impacted by the input action.

In examples, logic for implementing the extrapolation logic 134 and/or the predictive logic 136 can be developed in part on the user device 10. As an addition or variation, logic for implementing the extrapolation logic 134 and/or the predictive logic 136 can be retrieved from a remote location. In some implementations, the extrapolation logic 134 and/or the predictive logic 136 can be tuned for the user of the computing device 10 over time. By way of example, predictive logic 136 can be implemented with one or more predictive models, which may reside on or off the computing device 10.

In variations, the input action determination logic 132 can make inferences based on user input information 127 and/or profile information 109. For example, the input action determination logic 132 can infer a desired outcome for an in-progress input action before the user has completed the input action. In some examples, the rendering engine 120 can update the DIUE 125 and its accompanying data structure set 111 to reflect the desired outcome for an in-progress input action.

In some examples, the rendering engine 120 includes a preview component 130 to temporarily render determined input actions of the user as potential changes which the user can elect to make or not make to the DIUE 125. For example, based on the input information 127, the input action determination logic 132 can infer a desired set of attributes as an outcome for one or more objects that are directly indicated by the input action.

With further reference to an example of FIG. 1, the rendering engine 120 includes a preview component 130 to temporarily render at least a portion of the DIUE 125 to reflect the desired outcome. In examples, the preview component 130 can generate a preview 131, corresponding to the temporary rendering of the DIUE 125 (or portion thereof) in a manner that reflects one or more possible outcomes of an input action. Depending on implementation, the user may respond to the preview 131 in one or more ways—for example, the user may (i) accept the changes to the DIUE 125 as reflected in the preview 131, (ii) the user may reject the changes reflected by the preview 131, and/or (iii) the user may elect to modify or change the DIUE 125 based on changes reflected in the preview 131. The particular outcome which may result once the preview 131 is rendered can be affirmatively selected by the user, or it may be determined by default, such as when no action is taken by the user.

Depending on implementation, the preview component 130 can generate the preview 131 to be rendered in any one of multiple configurations. For example, the preview 131 can be integrated so as to replicate the DIUE 125 for a temporary time interval, such as for the duration of the user completing the input action. In such examples, the preview 131 can disappear upon the user completing the input action, while the rendering engine 120 implements an input action based on the user's input prior to terminating the input action. For example, the preview 131 can reflect that one of the objects will be conflicted with a constraint while the user drags or otherwise moves an object to parent another object. In response to viewing the preview 131, the user may decide against completing the input action, causing the user to cancel the input (e.g., move pointer off-screen, or object back to original position). The rendering engine 120 may then respond by terminating the preview 131 and maintaining the objects in the state preceding the user initiating the input action. As an addition or variation, the preview 131 can be implemented as an overlay or temporary aspect of the DIUE 125 and/or the canvas 122, such that the preview 131 disappears when the user makes a selection as to an outcome for the user's input action. As another example or variation, the preview 131 can disappear after a designated event occurs (e.g., the passage of time). In some implementations, the preview 131 can be rendered for the duration that allows for the user to modify the DIUE 125. For example, the user may freeze the rendering of the preview 131 in order to make changes to the design as represented in the preview 131. If an outcome determined from the preview 131 is different than the DIUE 125, the rendering engine 120 may implement the changes, such that the DIUE 125 and the corresponding data structure representations 111 can each reflect the changes represented by the determined outcome.

According to examples, the rendering engine 120 can execute the constraint logic 146 to implement a set of predefined constraints 145 when rendering the DIUE 125. The constraints 145 can be specified for a variety of reasons, such as to prevent unwanted visual effects (e.g., lack of symmetry, etc.) in the course of the DIUE 125 being created. Individual constraints 145 may also be specified in connection with the run-time rendering the design interface, such as, for example, to safeguard the DIUE 125 against an unwanted condition or event that occurs in the course of an underlying application being executed in a run-time environment. Accordingly, some examples provide that each of the constraints 145 can be deployed to limit the value of a particular type of attribute, or types of attributes, in connection with specific object(s), regions or locations of the canvas 122, and/or other predefined binds. In this manner, the constraints 145 can be deployed to enforce a rule or condition (or combination of rules/conditions) with regard to objects and other aspects of the DIUE 125.

In examples, the set of constraints 145 can be of different type, such as positional constraint(s), size constraints, relational constraints, conditional constraints and/or user-defined constraints. Positional constraints can require an object (or portion thereof) to occupy (or not occupy) a particular location in connection with a particular reference (e.g., line or point), such that a location-related attribute (or combination of attributes) of a subjugated object is limited in its respective range of values. Size constraints can subject one or more dimensions of an object to a limit (e.g., maximum or minimum dimension). A conditional constraint can limit the attribute value of an object based on the existence of a condition (e.g., spacing to one or multiple other objects). Relational constraints can include conditional constraints which limit the value of an object's attribute based on the attribute value of another object. For example, an object's size may be limited by an object's relationship to another object, such as a constraint where an object cannot be parented by a smaller object. Similarly, a conditional constraint may also limit a dimension of an object to a condition, such as a dimension of a wire frame for the object.

According to examples, the constraints 145 can originate from different sources. A user of the computing device 10 can specify a set of constraints 145 to facilitate his or her own effort in creating the DIUE 125 and/or to ensure the DIUE 125 avoids unintended visual consequences during, for example, a run-time environment. In some examples, the constraints 145 which are implemented on the computing device 10 can be specified by other users operating other computing devices. In examples in which the IGDS 100 is implemented as part of a collaborative environment (see FIG. 1C), multiple users can create different constraints 145 over the course of the DIUE 125 being created. In such implementations, constraints may operate to different levels of complexity. For example, in some use cases, experienced designers of a group may be able to specify constraints 145 which users of lesser roles or experience may not understand or appreciate. Still further, some types of constraints may be generated by default. For example, constraints 145 regarding the alignment or sizing of parented objects may be implemented by default.

According to some examples, the rendering engine 120 can use the constraint logic 146 to analyze the user input and/or to render an outcome of the user's input action, to prevent instances where objects of the DIUE 125 are provided an attribute value (or set of values) that are in conflict with one or more constraints 145. The rendering engine 120 can use the constraint logic 146 to check attribute values of objects which are manipulated or created on the canvas 122 to determine if the object obtains attribute values conflict with one or more of the constraints 145.

As an addition or variation, the rendering engine 120 can use the input action determination logic 132, in combination with the constraint logic 146, to determine when a likely or predicted input action will cause one or more objects of the DIUE 125 to conflict one or more of the constraints 145. For example, the rendering engine 120 may utilize the input action determination logic 132 to determine an extrapolated or predicted attribute value (or set of attribute values) for an object that is being directly manipulated by an input action that is in progress. In such examples, the object that is being directly manipulated, as well as a desired attribute of that object (e.g., desired location or dimension for the object) can be inferred, using, for example, the extrapolation logic 134 and/or prediction logic 136. Accordingly, in some examples, an object that is being directly manipulated by an input action can be determined to be in conflict with one of the constraints 145 in advance of, or contemporaneously with the user completing the input action.

Additionally, the rendering engine 120 can use the input action determination logic 132, in combination with the constraint logic 146, to determine when a likely or predicted input action will cause a secondary object (i.e., an object other than the object that is being directly manipulated by the input action) to conflict with one of the constraints 145. For example, one or more of the constraints 145 may subjugate a first object that exists as part of the DIUE 125, and the input action determination logic 132 may use the input information 127 to detect or infer an input action that directly manipulates a second object. The rendering engine 120 can use the constraint logic 146 to determine that the determined or inferred input action, when implemented on the second object, causes the first object to be in violation of the constraint.

In examples, if the constraint logic 146 determines that an input action has caused or will cause one or more objects of the DIUE 125 to be in conflict with one or more of the constraints 145, the preview component 130 generates the preview 131 to depict an outcome that identifies the one or more objects that are in conflict. In examples, the preview component 130 can generate the preview 131 to display the conflicting objects in a state of conflict—such as would be the case if the conflicted constraint is ignored. As an addition or variation, the preview component 130 can generate the preview 131 to depict an alternative outcome, where at least one of the objects that would otherwise have conflicted with the constraint are provided attribute values (e.g., location, size, etc.) that would avoid the conflict with the constraint from occurring.

In examples, the rendering engine 120 can resolve an outcome of the first input action based on a user's response to the preview 131. For example, the preview 131 can be generated as an overlay that is displayed over the DIUE 125, to depict one or more objects that would be in conflict as a result of the input action as being in one of a conflicted state or a resolved state. In the conflicted state, the preview 131 represents the outcome of the determined input action without regard for the constraint that would otherwise be disregarded.

In the resolved state, the preview 131 represents an alternative outcome, where the object(s) that affected by the input action are modified so as to have attribute values which would avoid conflict with the constraint in question. In some examples, the constraint logic 146 can include logic to determine attribute values which would avoid the objects affected by the input action from conflicting with the constraint. As an addition or alternative, the user can provide input while the preview 131 is rendered, where the inputs specify the attributes which the indicated objects are to have so as to not violate the constraint.

In some examples, the preview 131 can display the objects affected by the user's input action in both the conflicting and resolved stated. For example, the preview 131 can alternate in depicting the objects of the input action in one of the conflicted or resolved state and then in the other of the conflicted or resolved states. If the user's response is to select the conflicted state, the rendering engine 120 can complete the user's input action without regard for the conflicting constraint. Alternatively, if the user's response is to select the resolved state, the rendering engine 120 can modify the DIUE 125 by providing the object(s) affected by the input action with attribute(s) that avoid conflict with the constraint 145 that was being violated. Still further, in other variations, the user can elect to cancel or undo the input action upon, for example, viewing the preview 131. The rendering engine 120 can reflect the outcome of the input action on the DIUE 125, and further record the change caused by the outcome with the corresponding data structure representations 111.

In variations, the user's response to the preview 131 can be to modify the input action and/or the attributes of the one or more objects which are affected by the input action, such that the particular constraint is not violated. The rendering engine 120 can implement the modifications to the conflicted object(s) with the DIUE 125 and the data structure representations 111, such that the outcome of the input action does not cause a violation of any one of the constraints 145.

Still further, the user's response to the preview 131 can be to cancel the input action, such that no modification is made to the DIUE 125 or to the corresponding data structure representations 111. In this way, the preview 131 can be temporarily displayed to enable the user to select against completing the action.

Network Computing System to Implement IGDS

Figure 1B:
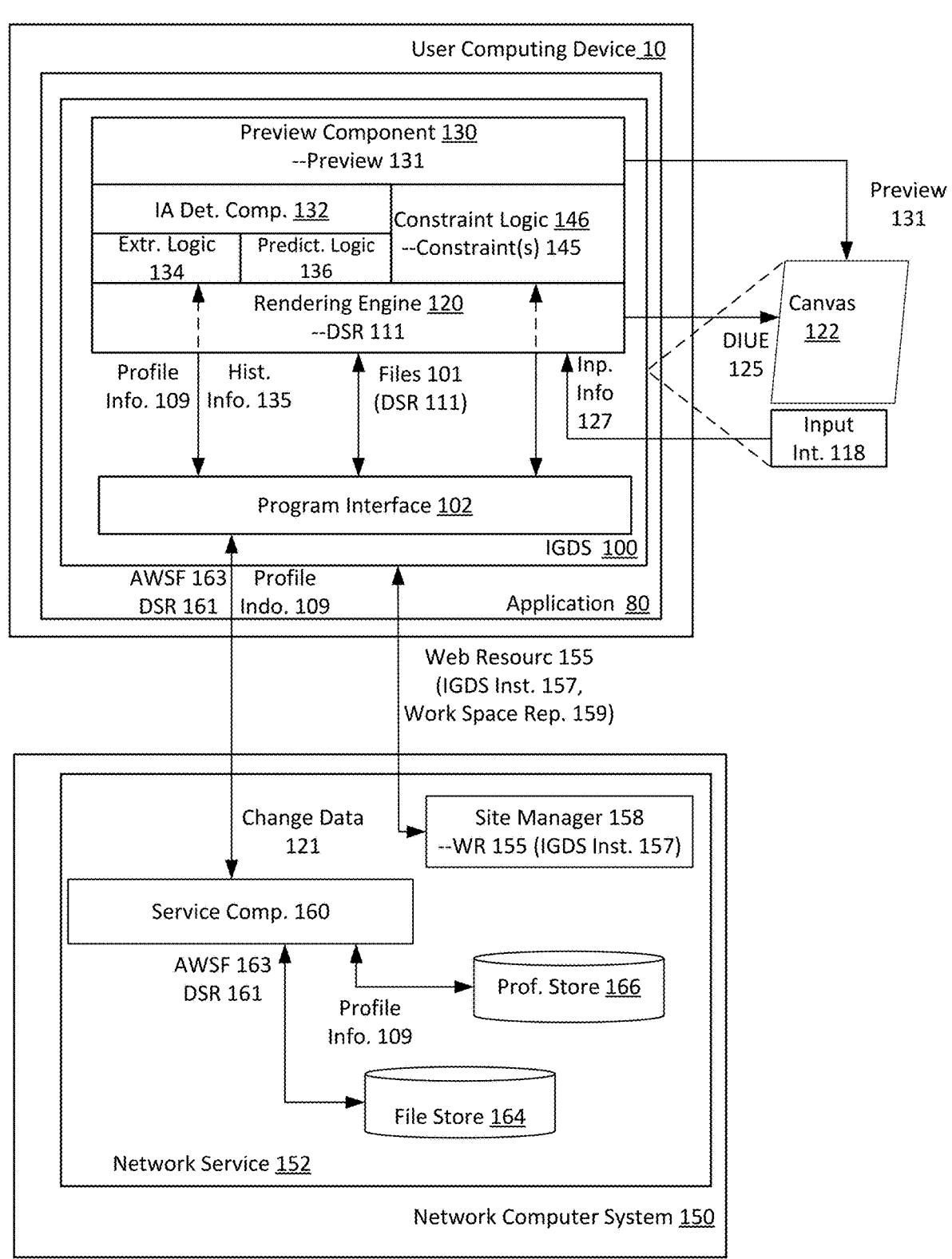
FIG. 1B illustrates a network computing system to implement an interactive graphic design system on a user computing device, according to one or more examples.

FIG. 1B illustrates a network computing system to implement an interactive graphic design system on a user computing device, according to one or more examples. A network computing system such as described with an example of FIG. 1B can be implemented using one or more servers which communicate with user computing devices over one or more networks.

In an example of FIG. 1B, the network computing system 150 perform operations to enable the IGDS 100 to be implemented on the user computing device 10. In variations, the network computing system 150 provides a network service 152 to support the use of the IGDS 100 by user computing devices that utilize browsers or other web-based applications. The network computing system 150 can include a site manager 158 to manage a website where a set of web-resources 155 (e.g., web page) are made available for site visitors. The web-resources 155 can include instructions, such as scripts or other logic ("IGDS instructions 157"), which are executable by browsers or web components of user computing devices.

In some variations, once the computing device 10 accesses and downloads the web-resources 155, web-based application 80 executes the IGDS instructions 157 to implement functionality such as described with some examples of FIG. 1A. For example, the IGDS instructions 157 can be executed by web-based application 80 to initiate the program interface 102 on the user computing device 10. The initiation of the program interface 102 may coincide with the establishment of, for example, a web-socket connection between the program interface 102 and a service component 160 of the network computing system 150.

In some examples, the web-resources 155 includes logic which web-based application 80 executes to initiate one or more processes of the program interface 102, causing the IGDS 100 to retrieve additional programmatic resources and data sets for implementing functionality as described by examples. The web resources 155 can, for example, embed logic (e.g., JAVASCRIPT code), including GPU accelerated logic, in an HTLM page for download by computing devices of users. The program interface 102 can be triggered to retrieve additional programmatic resources and data sets from, for example, the network service 152, and/or from local resources of the computing device 10, in order to implement the IGDS 100. For example, some of the components of the IGDS 100 can be implemented through web-pages that can be downloaded onto the computing device 10 after authentication is performed, and/or once the user performs additional actions (e.g., download one or more pages of the workspace associated with the account identifier). Accordingly, in examples as described, the network computing system 150 can communicate the IGDS instructions 157 to the computing device 10 through a combination of network communications, including through downloading activity of web-based application 80, where the IGDS instructions 157 are received and executed by web-based application 80.

The computing device 10 can use web-based application 80 to access a website of the network service 152 to download the webpage or web resource. Upon accessing the website, web-based application 80 can automatically (e.g., through saved credentials) or through manual input, communicate an account identifier to the service component 160. In some examples, web-based application 80 can also communicate one or more additional identifiers that correlate to a user identifier.

Additionally, in some examples, the service component 160 can use the user or account identifier of the user identifier to retrieve profile information 109 from a user profile store 166. As an addition or variation, profile information 109 for the user can be determined and stored locally on the user's computing device 10. As described with other examples, the user profile information can be used to infer an outcome of an input action, based on the inputs of the user with respect to the DIUE 125 (such as detected by the input interface 118). For example, the profile information 109 can be communicated to the IGDS 100, where the profile information 109 can be used to implement and develop the predictive logic 134.

The service component 160 can also retrieve the files of an active workspace ("active workspace files 163") that are linked to the user account or identifier from a file store 164. The profile store 166 can also identify the workspace that is identified with the account and/or user, and the file store 164 can store the data sets that comprise the workspace. The data sets stored with the file store 164 can include, for example, the pages of a workspace, data sets that identify constraints for an active set of workspace files, and one or more data structure representations 161 for the design under edit which is renderable from the respective active workspace files.

Additionally, in examples, the service component 160 provides a representation 159 of the workspace associated with the user to the web-based application 80, where the representation identifies, for examples, individual files associated with the user and/or user account. The workspace representation 159 can also identify a set of files, where each file includes one or multiple pages, and each page including objects that are part of a design interface.

On the user device 10, the user can view the workspace representation through web-based application 80, and the user can elect to open a file of the workspace through web-based application 80. In examples, upon the user electing to open one of the active workspace files 163, web-based application 80 initiates the canvas 122. For example, the IGDS 100 can initiate an HTML 5.0 canvas as a component of web-based application 80, and the rendering engine 120 can access one or more data structures representations 111 of a design interface under edit, to render the corresponding DIUE 125 on the canvas 122.

The service component 160 may also determine, based on the user credentials, a permission setting or role of the user in connection with the account identifier. The permission settings or role of the user can determine, for example, the files which can be accessed by the user. In some examples, the implementation of the rendering engine 120 on the computing device 10 can be configured based at least in part on the role or setting of the user. For example, the user's ability to specify constraints for the DIUE 125 can be determined by the user's permission settings, where the user can be enabled or precluded from creating constraints 145 for the DIUE 125 based on their respective permission settings. Still further, in some variations, the response action which the user can take to resolve a conflict can be limited by the permission setting of the user. For example, the ability of the user to ignore constraints 145 can be based on the permission setting of the user.

In examples, the changes implemented by the rendering engine 120 to the DIUE 125 can also be recorded with the respective data structure representations 111, as stored on the computing device 10. The program interface 102 can repeatedly, or continuously stream change data 121 to the service component 160, wherein the updates reflect edits as they are made to the DIUE 125 and to the data structure representation 111 to reflect changes made by the user to the DIUE 125 and to the local data structure representations 111 of the DIUE 125. The service component 160 can receive the change data 121, which in turn can be used to implement changes to the network-side data structure representations 161. In this way, the network-side data structure representations 161 for the active workspace files 163 can mirror (or be synchronized with) the local data structure representations 111 on the user computing device 10. When the rendering engine 120 implements changes to the DIUE 125 on the user device 10, the changes can be recorded or otherwise implemented with the local data structure representations 111, and the program interface 102 can stream the changes as change data 121 to the service component 160 in order to synchronize the local and network-side representations 111, 161 of the DIUE 125. This process can be performed repeatedly or continuously, so that the local and network-side representations 111, 161 of the DIUE 125 remain synchronized.

Collaborative Network Platform

Figure 1C:
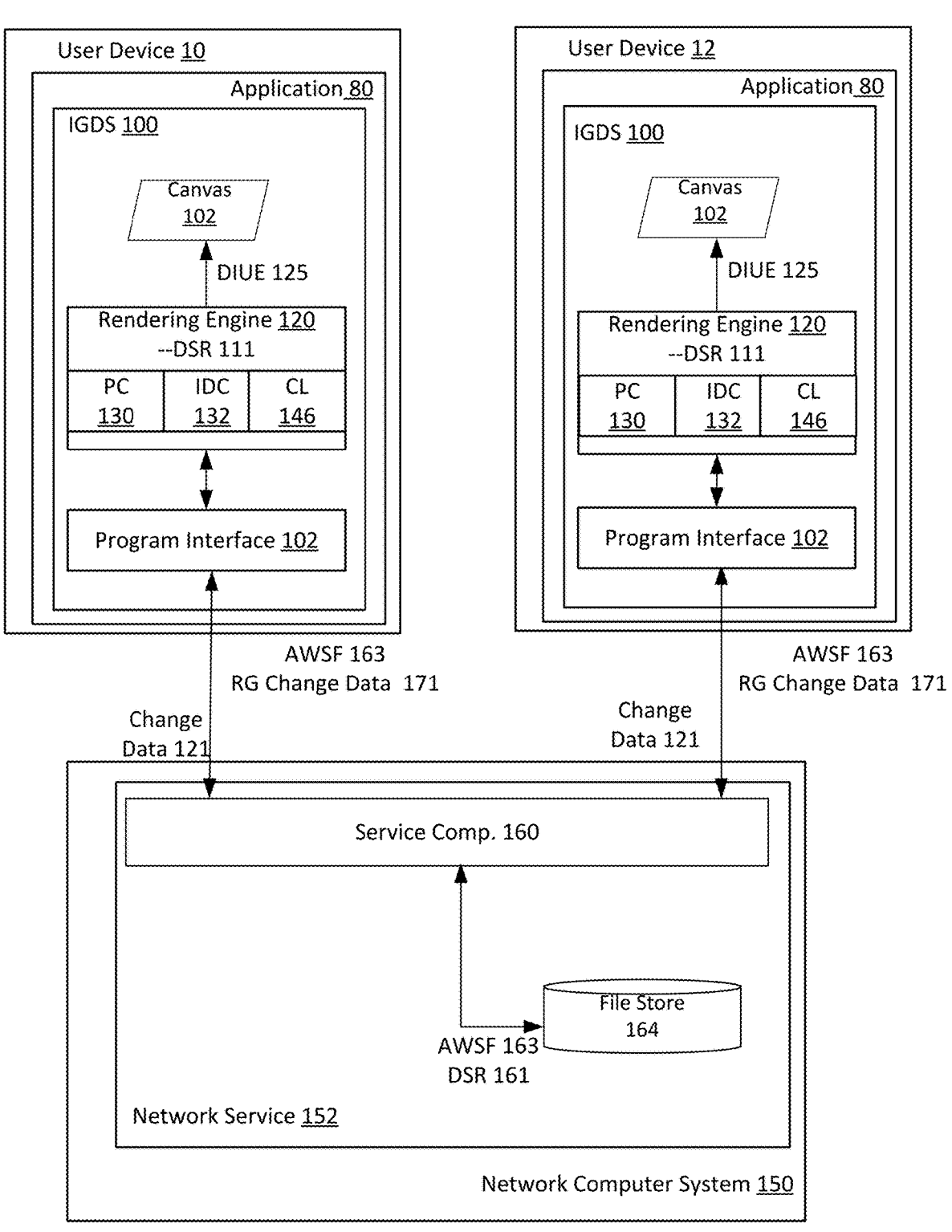
FIG. 1C illustrates a network computing system to implement an interactive graphic design system for multiple users in a collaborative network platform, according to one or more examples.

FIG. 1C illustrates a network computing system to implement an interactive graphic design system for multiple users in a collaborative network platform, according to one or more examples. In an example of FIG. 1C, a collaborative network platform is implemented by the network computing system 150, which communicates with multiple user computing devices 10, 12 over one or more networks (e.g., World Wide Web) to implement the IGDS 100 on each computing device. While FIG. 1C illustrates an example in which two users utilize the collaborative network platform, examples as described allow for the network computing system 150 to enable collaboration on design interfaces amongst a larger group of users.

With respect to FIG. 1C, the user computing devices 10, 12 can be assumed as being operated by users that are associated with a common account, with each user computing device 10, 12 implementing a corresponding IGDS 100 to access the same workspace during respective sessions that overlap with one another. Accordingly, each of the user computing devices 10, 12 may access the same set of active workspace files 163 at the same time, with the respective program interface 102 of the IGDS 100 on each user computing device 10, 12 operating to establish a corresponding communication channel (e.g., web socket connection) with the service component 160.

In examples, the service component 160 can communicate a copy of the active workspace files 163 to each user computing device 10, 12, such that the computing devices 10, 12 render the DIUE 125 of the active workspace files 163 at the same time. Additionally, each of the computing devices 10, 12 can maintain a local data structure representation 111 of the respective DIUE 125, as determined from the active workspace files 163. The service component 160 can also maintain a network-side data structure representation 161 obtained from the files of the active workspace 163, and coinciding with the local data structure representations 111 on each of the computing devices 10, 12.

The network computing system 150 can continuously synchronize the active workspace files 163 on each of the user computing devices. In particular, changes made by users to the DIUE 125 on one computing device 10, 12 may be immediately reflected on the DIUE 125 rendered on the other user computing device 10, 12. By way of example, the user of computing devices 10 can make a change to the respective DIUE 125, and the respective rendering engine 120 can implement an update that is reflected in the local copy of the data structure representation 111. From the computing device 10, the program interface 102 of the IGDS 100 can stream change data 121, reflecting the change of the user input, to the service component 160. The service component 160 processes the change data 121 of the user computing device. The service component 160 can use the change data 121 to make a corresponding change to the network-side data structure representation 161. The service component 160 can also stream remotely-generated change data 171 (which in the example provided, corresponds or reflects change data 121 received from the user device 10) to the computing device 12, to cause the corresponding IGDS 100 to update the DIUE 125 as rendered on that device. The computing device 12 may also use the remotely generated change data 171 to update with the local data structure representation 111 of that computing device 12. The program interface 102 of the computing device 12 can receive the update from the network computing system 150, and the rendering engine 120 can update the DIUE 125 and the respective local copy of 111 of the computing device 12.

The reverse process can also be implemented to update the data structure representations 161 of the network computing system 150 using change data 121 communicated from the second computing device 12 (e.g., corresponding to the user of the second computing device updating the DIUE 125 as rendered on the second computing device 12). In turn, the network computing system 150 can stream remotely generated change data 171 (which in the example provided, corresponds or reflects change data 121 received from the user device 12) to update the local data structure representation 111 of the DIUE 125 on the first computing device 10. In this way, the DIUE 125 of the first computing device 10 can be updated as a response to the user of the second computing device 12 providing user input to change the DIUE 125.

To facilitate the synchronization of the data structure representations 111, 111 on the computing devices 10, 12, the network computing system 150 may implement a stream connector to merge the data streams which are exchanged between the first computing device 10 and the network computing system 150, and between the second computing device 12 and the network computing system 150. In some implementations, the stream connector can be implemented to enable each computing device 10, 12 to make changes to the network-side data representation 161, without added data replication that may otherwise be required to process the streams from each device separately.

Additionally, over time, one or both of the computing devices 10, 12 may become out-of-sync with the server-side data representation 161. In such cases, the respective computing device 10, 12 can redownload the active workspace files 163, to restart the maintenance of the data structure representation of the DIUE 125 that is rendered and edited on that device.

Preview in Collaborative Environment

Methodology

According to examples, one of the users (e.g., operating computing device 10) can provide user input that the rendering engine 120 processes to generate a preview 131. For example, the rendering engine 120 can use the input action determination logic 132 to infer an output of a user input action that is in progress (e.g., user clicking and dragging an object on the canvas 122), and in response to making the inference, the preview component 130 can generate the preview 131 to reflect an outcome of the inferred input action. As described with other examples, the preview 131 can be rendered with the DIUE 125 to provide the user with an ability to alter course (e.g., choose another input action). The preview 131 can be generated to enable the user to view a possible outcome of their desired input action on the preview before the outcome is implemented as a change to the DIUE 125. Once the rendering engine 120 makes the change to the DIUE 125, the respective data structure representation 111 can be updated, and the change can be communicated in real-time, via the service component 160 of the network computing system 150, to the rendering engine 120 of the IGDS 100. Among other benefits, in a collaborative environment, the preview component 130 can enable one user to view an outcome of a desired input action before propagating the change to the rendering of the DIUE 125 provided on other collaborating computing devices.

Additionally, as described with some examples, the rendering engine 120 can use the constraint logic 146 to detect instances when, for example, the outcome of a desired input action causes one or more objects of the DIUE 125 (as locally rendered) to be in conflict. Rather than propagate a potential mistake to the renderings of the DIUE 125 on other user computing devices, the rendering engine 120 generates the preview 131 to enable the respective user to view and select the desired outcome.

Examples further recognize that in a collaborative environment, individual users may create constraints that are effective for all users that are working on the same DIUE 125. By way of example, the network computing system 150 may enable at least some users (e.g., those users who have a threshold permission setting) operating corresponding user computing devices 10, 12 to utilize the input interface 118 of the respective IGDS 100 to create constraints that are effective for all users. The program interface 102 of the respective IGDS 100 can transmit the constraint to the network computing system 150, and the service component 160 may update the active workspace files 163 to reflect the newly added constraint. The service component 160 can also communicate the newly defined constraint to other computing devices 10, 12 which in turn may update their respective set of constraints 145 for use with constraint logic 146.

Examples recognize that in a collaborative environment, opportunity exists for users to create constraints which impact other users without their advance knowledge. For users that are unaware of newly created constraints, the rendering engine 120 can process the input information 127 to determine when the user input results in a conflict with the newly created constraint. As an addition or variation, the rendering engine 120 can generate the preview 131 to temporarily display the conflicted state of affected objects without regards to the new constraint for the corresponding user. The preview 131 can allow the user to elect an alternative option if warranted, thereby avoiding an unwanted conflicted state of the DIUE 125 from being propagated to other users that are collaborating on the same active workspace files 163.

FIG. 2 illustrates a method for updating a design interface under edit, according to one or more examples. A method such as described by an example of FIG. 2 may be implemented on a user computing device that is configured to enable users to generate and edit design interfaces. For example, a method such as described by FIG. 2 may be implemented by user computing devices on which an integrated graphic design system ("IGDS") such as described with examples of FIG. 1A through FIG. 1C is implemented. Accordingly, reference may be made to elements of FIG. 1A through FIG. 1C for purpose of illustrating suitable components for performing a step or sub-step being described.

In examples, the user computing device 10, 12 can operate to (i) render a design interface under edit, and (ii) enable the user to edit the design interface under edit. In response to receiving user input, the computing device 10, 12 can determine one or more input actions of the user (210). In some examples, the computing device may receive one or more inputs of the user, reflecting the user initiating or performing an input action. For example, the computing device 10, 12 may detect the user clicking a pointer to select an object on the canvas, and/or the user moving the selected object. Based on an initial input, the computing device may infer or otherwise determine an outcome of the input action (212).

In some variations, the computing device 10, 12 predicts the outcome of the input action based on, for example, a predictive analysis that is performed using the user's input history, as well as the analysis of the design under edit, and/or other information which may be indicative of the user's desired outcome when initiating an input action. As an addition or variation, the computing device 10, 12 can infer the outcome of an input action by extrapolating the attribute values of a series of user inputs while the input action is in progress. For example, the computing device 10, 12 can calculate the trajectory of a user's drag motion to infer that the user's input action is intended to reparent a selected object to another existing object.

In examples, the computing device 10, 12 can make a determination that implementing the determined input action would cause one or more objects of the design under edit to be in conflict with a predefined constraint (220). The computing device can make the determination in advance of implementing the input action. For example, as described with other examples, the computing device 10, 12 may use the IGDS 100 to render the DIUE 125, and the rendering engine 120 may use the constraint logic 146 to make the determination of whether a determined input action of the user violates a constraint before the rendering engine 120 updates the DIUE 125 to reflect the input action. In some examples, the determination may be predictive or extrapolative, and the determination may be made in advance of the user completing the input action.

In response to the computing device 10, 12 making the determination that the input action conflicts with the constraint, the computing device generates a preview which depicts or otherwise indicates to the user a conflict resulting from the user's input action (230). By way of example, the IGDS 100 implemented with the user computing device 10 can generate a preview 131 to depict one or more objects that are affected by a user's input action. In some implementations, the preview 131 can depict an object that is selected or otherwise directly indicated by the user's action as being in conflict.

In some examples, the computing device 10, 12 makes a determination as to whether an input action that is specific to a first object results in a second existing object of the design under edit becoming in conflict with a constraint (232). For example, a user's input action may directly indicate a first object, while a second object exists on the canvas 122 and is subjugate to a constraint. The computing device 10, 12 may determine that the input action to the first object would cause the second object to be in conflict with the constraint. In such case, an implementation provides for the preview 131 to be generated to reflect or otherwise indicate that the input action would cause a conflict state for the second object.

According to some examples, the computing device 10, 12 may resolve an outcome for the determined input action of the user based on a user's response (or non-response) to the preview 131 (240). In some examples, the user computing device 10, 12 can provide for the user's response to include an option where the user can accept an outcome of the input action without regard for the conflicting constraint.

As an addition or alternative, the user computing device 10, 12 can provide for the user's response to include an option where the user can cancel the input action. Still further, in some examples, the user computing device 10, 12 can provide for the user's response to include an option where one or more objects which would be in conflict with the constraint are modified in a manner which would prevent the conflict from occurring. In examples, the computing device 10, 12 may resolve the conflict based on the user response or non-response. For example, no action (e.g., passage of threshold duration of time) by the user can result in the computing device implementing the option that is designated to be the default.

EXAMPLES

Figure 3A:
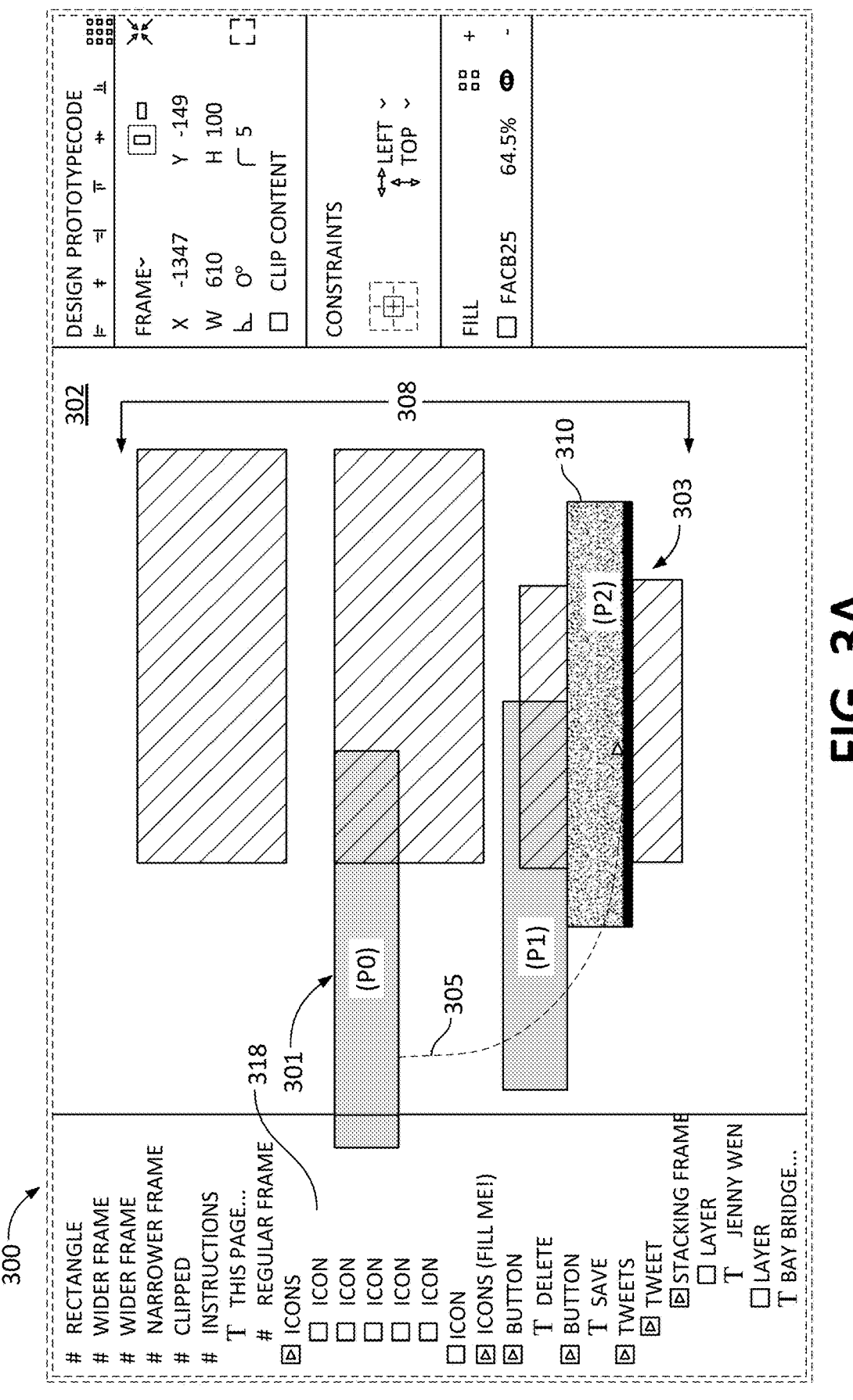
FIG. 3A and FIG. 3B illustrate a user interface for an interactive graphic design system, in accordance with one or more examples.
Figure 3B:
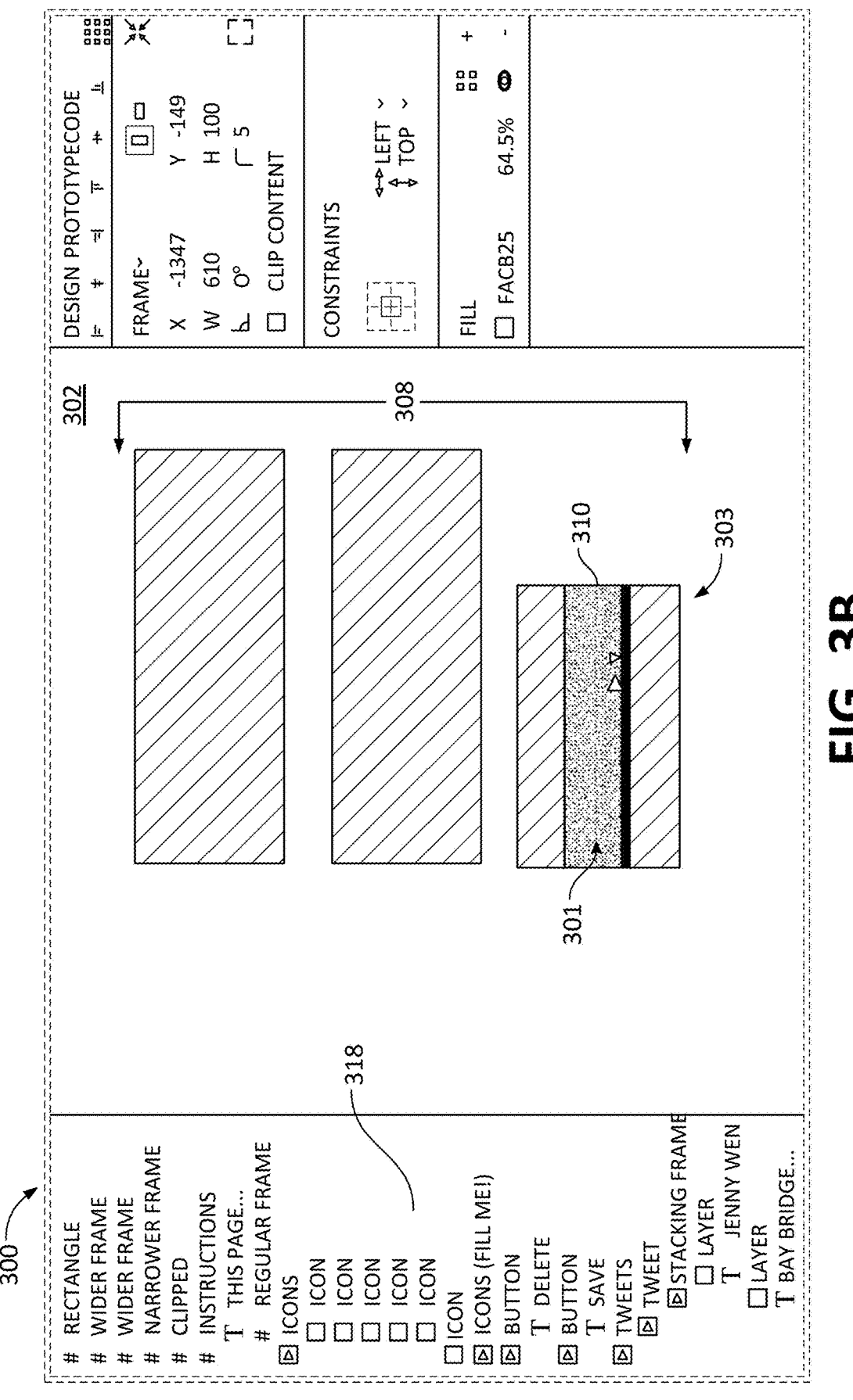
Figure 4A:
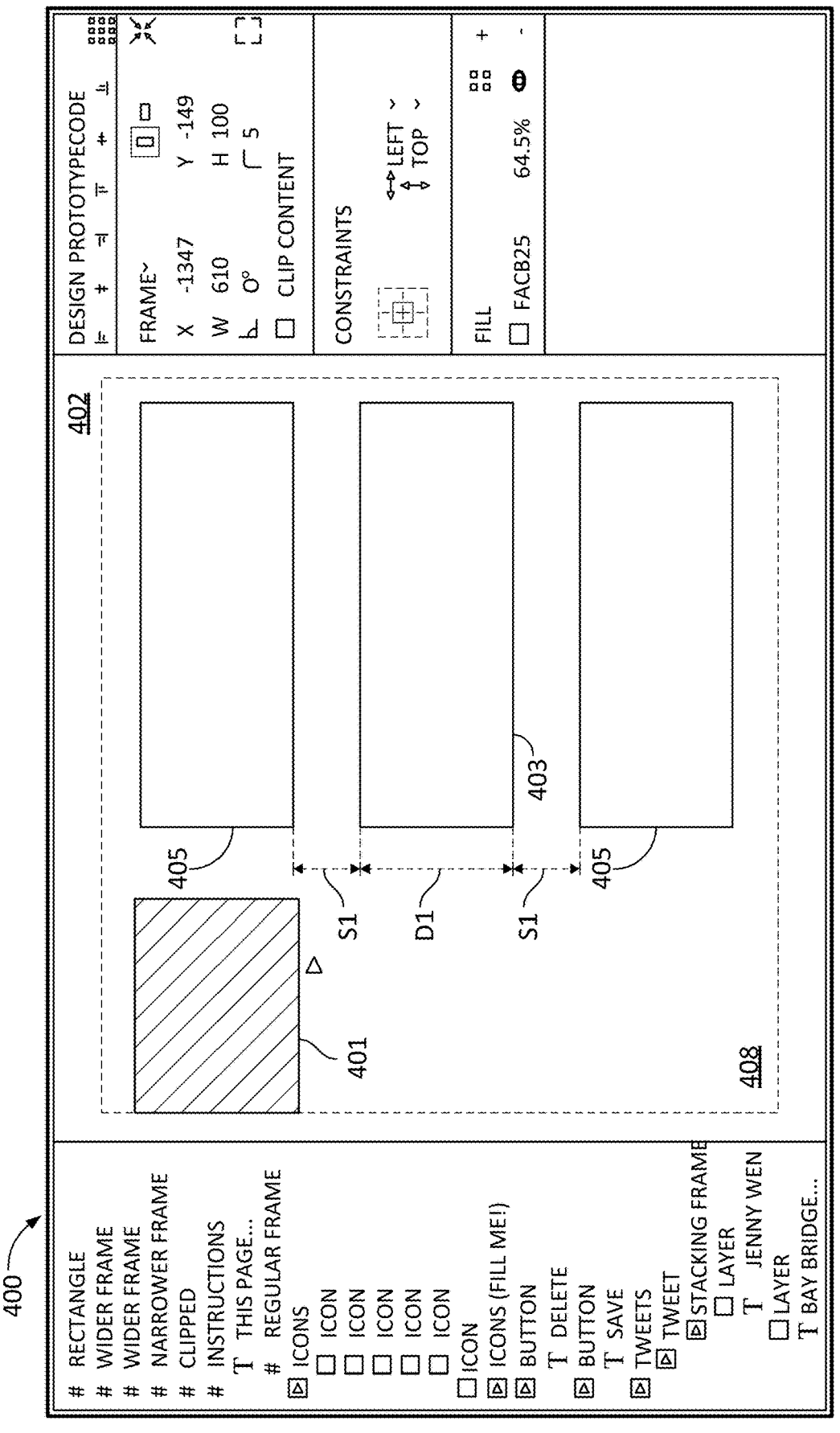
FIG. 4A and FIG. 4B illustrate another user interface for an interactive graphic design system, in accordance with one or more examples.
Figure 4B:
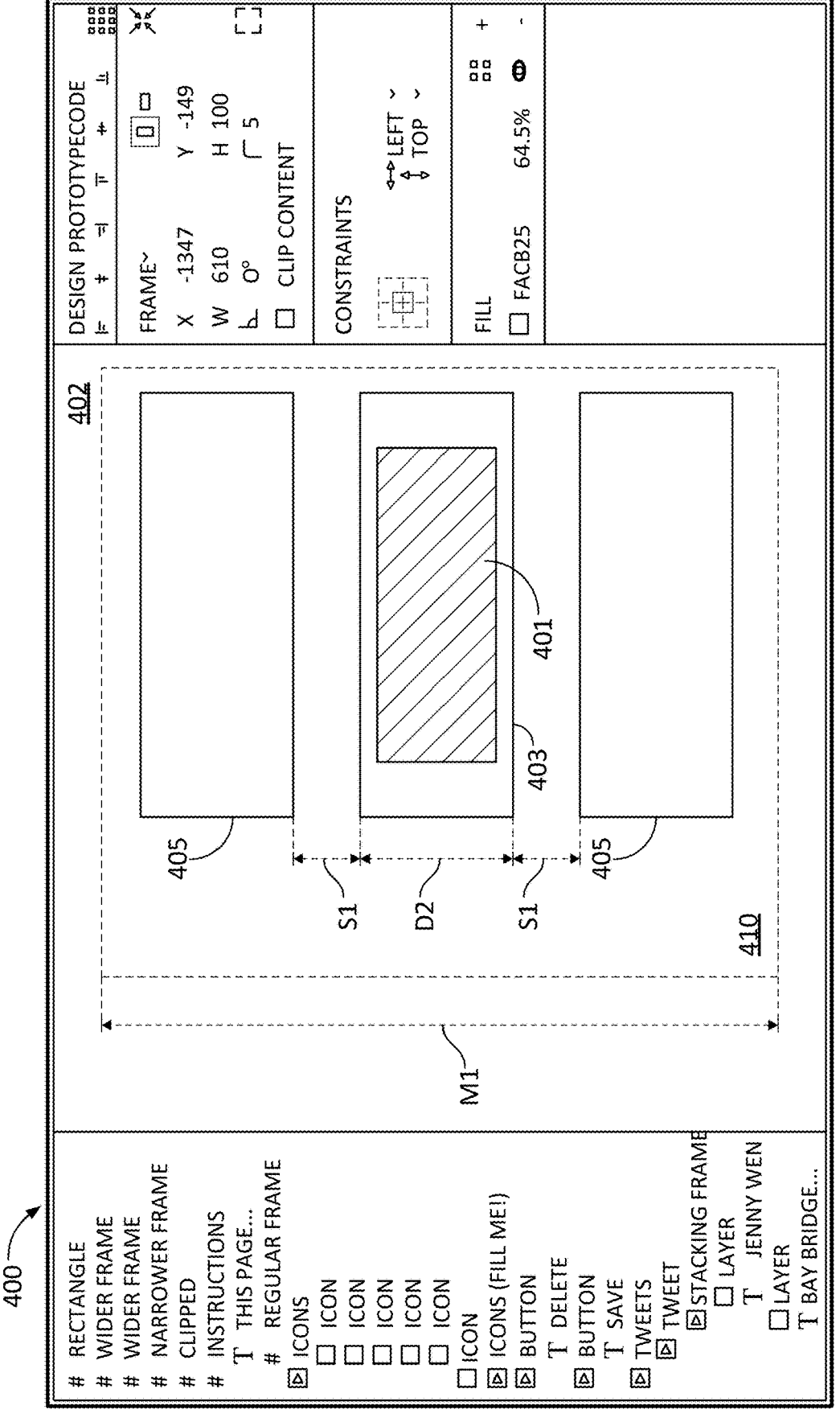

FIG. 3A and FIG. 3B illustrate a user interface for an interactive graphic design system, in accordance with one or more examples. FIG. 4A and FIG. 4B illustrate another user interface for an interactive graphic design system, in accordance with one or more examples. Example user interfaces, as shown and described by FIG. 3A and FIG. 3B, and by FIG. 4A and FIG. 4B, may be generated by the IGDS 100, as described with various examples. In describing examples of FIG. 3A and FIG. 3B, and of FIG. 4A and FIG. 4B, reference may made to elements of FIG. 1A through FIG. 1C for purpose of illustrating suitable components for generating and implementing the user interfaces as described.

With reference to FIG. 3A and FIG. 3B, a user interface 300 includes a canvas 302 on which a design under edit ("DIUE 308") is rendered. The user interface 300 may also include an input interface 318 that can be provided with the canvas 302 to enable the user to specify inputs of different types. A user may utilize a design tool provided as part of the input interface 318 to create an object 301, which the user can subsequently manipulate with additional input.

In FIG. 3A, the object 301 is shown to move on the canvas 302 along an input path 305, reflecting the user's dragging motion. The positions of the object 301 are shown at a first instance in time ("P0"), second instance ("P2") and third instance ("P3"). As the object 301 moves towards and/or over the existing object 303, the IGDS 100 determines an outcome of the user's input action is to parent the object 301 to the existing object 303. In an example shown, the object 301 is shown as a preview, meaning the user input being provided with the object's movement are not implemented and made part of the DIUE 308. Depending on implementation, the IGDS 100 can process the user input provided in connection with the input path 305 to determine or infer an outcome of the user's input action. In some examples, as the object 301 moves towards and/or over the existing object 303, the IGDS 100 determines the desired outcome of the user's input action is to parent the object 301 to the existing object 303. The IGDS 100 may also determine that parenting the object 301 to the object 303 would violate a constraint that precludes the object 303 from parenting an object with larger dimensions.

In FIG. 3B shows the IGDS 100 as responding to the determination that the object 303 will be in conflict with a constraint as an outcome of the input action for the object 301. The IGDS 100 may generate a preview 310 that depicts an alternative outcome of the user's input action where the constraint is not conflicted. In an example shown, the preview 310 can correspond to a temporary rendering of one or both objects, showing alternative states of the objects being in conflict with the constraint and/or one or both objects having modified attributes such that a constraint is not violated.

As an addition or alternative, the dimensions of the object 303 can be altered for the preview 310 to avoid the conflict with the constraint. In an example shown, the preview 310 can be super-imposed or seamlessly integrated with respect to the DIUE 308, to reflect the input action resulted in a conflict with regards to one of the objects 301, 303. In variations, the preview 310 can be rendered as a window or panel. Still further, the rendering for the preview can include visual markers or indicators of, for example, the constraint that is being violated, the object that is violating the constraint, etc.

FIG. 4A and FIG. 4B illustrate a user interface 400 in which a DIUE 408 is provided over a canvas 402. As shown, a first object 401 is reparented to a second object 403 by an input action. The IGDS 100 may make a determination that the input action violates a parenting constraint. The IGDS 100 may also determine a possible resolution to avoid a conflict arising with a constraint. In example shown, the resolution is to enlarge the second object 403 to accommodate the first object 401. However, the enlargement of the second object 403 may result in another constraint conflict, as the second object 403 may be subject to a constraint that constrains the spacing between the object 403 and its neighbors 405, 405 (as represented by S1 in FIG. 4B). The IGDS 100 determined resolution for the conflict may thus include resizing the second object (as represented by D2) so that it can parent the first object 401, and moving (as represented by M1, M1) or resizing the neighboring objects 405 to preserve a spacing between the neighboring objects 405, 405 and the second object 403. The resolution can be displayed as a temporary preview 410 that the user can accept, reject and/or modify. As a temporary preview, the outcome of the alternative input can, for example, be reversed without further action from the user.

Network Computer System

Figure 5:
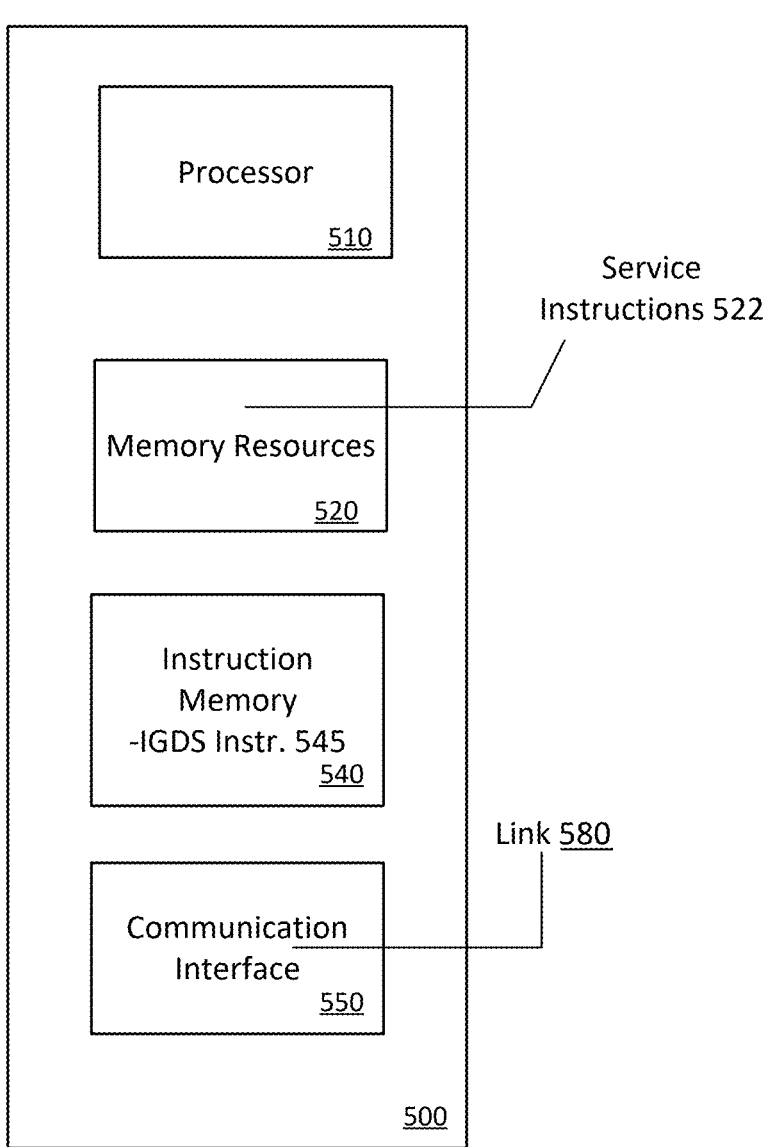
FIG. 5 illustrates a computer system on which one or more embodiments can be implemented.

FIG. 5 illustrates a computer system on which one or more embodiments can be implemented. A computer system 500 can be implemented on, for example, a server or combination of servers. For example, the computer system 500 may be implemented as the network computing system 150 of FIG. 1A through FIG. 1C.

In one implementation, the computer system 500 includes processing resources 510, memory resources 520 (e.g., read-only memory (ROM) or random-access memory (RAM)), one or more instruction memory resources 540, and a communication interface 550. The computer system 500 includes at least one processor 510 for processing information stored with the memory resources 520, such as provided by a random-access memory (RAM) or other dynamic storage device, for storing information and instructions which are executable by the processor 510. The memory resources 520 may also be used to store temporary variables or other intermediate information during execution of instructions to be executed by the processor 510.

The communication interface 550 enables the computer system 500 to communicate with one or more user computing devices, over one or more networks (e.g., cellular network) through use of the network link 580 (wireless or a wire). Using the network link 580, the computer system 500 can communicate with one or more computing devices, specialized devices and modules, and/or one or more servers.

In examples, the processor 510 may execute service instructions 522, stored with the memory resources 520, in order to enable the network computing system to implement the network service 152 and operate as the network computing system 150 in examples such as described with FIG. 1A through FIG. 1C.

The computer system 500 may also include additional memory resources ("instruction memory 540") for storing executable instruction sets ("IGDS instructions 545") which are embedded with web-pages and other web resources, to enable user computing devices to implement functionality such as described with the IGDS 100.

As such, examples described herein are related to the use of the computer system 500 for implementing the techniques described herein. According to an aspect, techniques are performed by the computer system 500 in response to the processor 510 executing one or more sequences of one or more instructions contained in the memory 520. Such instructions may be read into the memory 520 from another machine-readable medium. Execution of the sequences of instructions contained in the memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

User Computer Device

Figure 6:
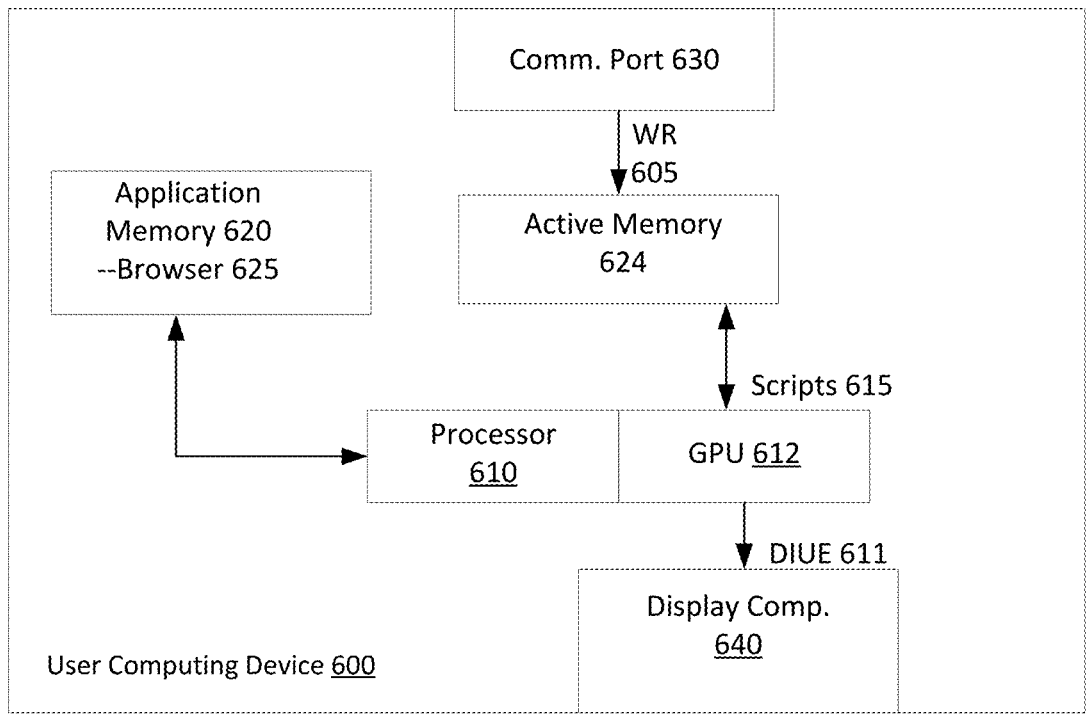
FIG. 6 illustrates a user computing device for use with one or more examples, as described.

FIG. 6 illustrates a user computing device for use with one or more examples, as described. In examples, a user computing device 600 can correspond to, for example, a work station, a desktop computer, a laptop or other computer system having graphics processing capabilities that are suitable for enabling renderings of design interfaces and graphic design work. In variations, the user computing device 600 can correspond to a mobile computing device, such as a smartphone, tablet computer, laptop computer, VR or AR headset device, and the like.

In examples, the computing device 600 includes a central or main processor 610, a graphics processing unit 612, memory resources 620, and one or more communication ports 630. The computing device 600 can use the main processor 610 and the memory resources 620 to store and launch a browser 625 or other web-based application. A user can operate the browser 625 to access a network site of the network service 152, using the communication port 630, where one or more web pages or other resources 605 for the network service 152 (see FIG. 1A through FIG. 1C) can be downloaded. The web resources 605 can be stored in the active memory 624 (cache).

As described by various examples, the processor 610 can detect and execute scripts and other logic which are embedded in the web resource in order to implement the IGDS 100 (see FIG. 1A through FIG. 1C). In some of the examples, some of the scripts 615 which are embedded with the web resources 605 can include GPU accelerated logic that is executed directly by the GPU 612. The main processor 610 and the GPU can combine to render a design interface under edit ("DIUE 611") on a display component 640. The rendered design interface can include web content from the browser 625, as well as design interface content and functional elements generated by scripts and other logic embedded with the web resource 605. By including scripts 615 that are directly executable on the GPU 612, the logic embedded with the web resource 615 can better execute the IGDS 100, as described with various examples.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:

a memory sub-system to store a set of instructions; and one or more processors that operate to communicate the set of instructions to a plurality of user devices, wherein the set of instructions include instructions that when executed by each user device of the plurality of user devices, causes the user device to:

responsive to implementing one or more input actions to modify a design under edit on a canvas of the user device, generate, in accordance with a first input action from a first user at a first user device, a constraint associated with a first object of the design under edit;

wherein for at least a second user device that renders the design under edit concurrently with the first user device, the set of instructions include instructions that, when executed by the second user device, cause the second user device to determine the one or more input actions to perform by:

responsive to user input received from a second user at the second user device, determining, before the second user completes a second input action with respect to a second object of the design under edit, that a completion of the second input action would result in the constraint associated with the first object and generated in accordance with the first input action from the first user being violated, an outcome of completion of the second input action being predicted based on historical activity associated with the second user with respect to the design under edit and one or more similar designs under edit, the outcome of completion of the second input action being based on a predicted type of input action, a predicted object that is the subject of the second input action, or a set of attributes for the predicted object; and rendering, before the second user completes a second input action with respect to a second object of the design under edit, at least one outcome for the one or more input actions that avoids violating the constraint.

2. The network computer system of claim 1 wherein the rendering is in accordance with a determination that the one or more input actions, when implemented on the second object, causes the first object to be in violation of the constraint.

3. The network computer system of claim 1 wherein the rendering further depicts an alternative outcome having at least one of the first and second objects that would otherwise have conflicted with the constraint being provided modified attribute values that avoid a conflict with the constraint.

4. The network computer system of claim 3 wherein at least one of the first and second users specify the modified attribute values that avoid the conflict with the constraint.

5. The network computer system of claim 4 wherein the modified attribute values are in accordance with a resizing of the second object such that it constitutes a parent of the first object.

6. The network computer system of claim 1 wherein responsive to the rendering, the second user is enabled to select against completing the second input action with respect to the second object of the design under edit.

7. The network computer system of claim 1 wherein the set of instructions include instructions for resolving the at least one outcome for the first input action based on enabling the user to provide input to override the constraint.

8. The network computer system of claim 7 wherein for at least the first user device, the set of instructions include instructions that, when executed by the first user device, cause the first user device to implement the one or more user actions by implementing a first user action to modify the design under edit without regard for the constraint.

9. The network computer system of claim 1 wherein the at least one outcome comprises multiple outcomes, and the set of instructions enable the user to select any one of the multiple outcomes.

10. The network computer system of claim 1 wherein the rendering visually indicates that the second input action, if implemented, causes the second object to conflict with the constraint.

11. A non-transitory computer-readable medium that stores a set of instructions, including instructions that, when executed by one or more processors of a computing device, operate to communicate the set of instructions to a plurality of user devices, the set of instructions further including instructions that when executed by each user device of the plurality of user devices, cause the computing device to perform operations to:

responsive to implementing one or more input actions to modify a design under edit on a canvas of the user device, generate, in accordance with a first input action from a first user at a first user device, a constraint associated with a first object of the design under edit;

wherein for at least a second user device that renders the design under edit concurrently with the first user device, the set of instructions include instructions that, when executed by the second user device, cause the second user device to determine the one or more input actions to perform by:

responsive to user input received from a second user at the second user device, determining, before the second user completes a second input action with respect to a second object of the design under edit, that a completion of the second input action would result in the constraint associated with the first object and generated in accordance with the first input action from the first user being violated, an outcome of completion of the second input action being predicted based on historical activity associated with the second user with respect to the design under edit and one or more similar designs under edit, the outcome of completion of the second input action being based on a predicted type of input action, a predicted object that is the subject of the second input action, or a set of attributes for the predicted object; and rendering, before the second user completes a second input action with respect to a second object of the design under edit, at least one outcome for the one or more input actions that avoids violating the constraint.

12. The non-transitory computer-readable medium of claim 11 wherein the rendering is in accordance with a determination that the one or more input actions, when implemented on the second object, causes the first object to be in violation of the constraint.

13. The non-transitory computer-readable medium of claim 11 wherein the rendering further depicts an alternative outcome having at least one of the first and second objects that would otherwise have conflicted with the constraint being provided modified attribute values that avoid a conflict with the constraint.

14. The non-transitory computer-readable medium of claim 13 wherein the one or more processors enable at least one of the first and second users to specify the modified attribute values that avoid the conflict with the constraint.

15. The non-transitory computer-readable medium of claim 14 wherein the modified attribute values are in accordance with a resizing of the second object such that it constitutes a parent of the first object.

16. The non-transitory computer-readable medium of claim 11 wherein responsive to the rendering, the one or more processors enable the second user to select against completing the second input action with respect to the second object of the design under edit.

17. The non-transitory computer-readable medium of claim 11 wherein the set of instructions include instructions for resolving the at least one outcome for the first input action based on the one or more processors enabling the user to provide input to override the constraint.

18. The non-transitory computer-readable medium of claim 17 wherein for at least the first user device, the set of instructions include instructions that, when executed by one or more processors of the first user device, cause the first user device to implement the one or more user actions by implementing a first user action to modify the design under edit without regard for the constraint.

19. The non-transitory computer-readable medium of claim 11 wherein the at least one outcome comprises multiple outcomes, and the set of instructions enable the user to select any one of the multiple outcomes.

20. The non-transitory computer-readable medium of claim 11 wherein the rendering visually indicates that the second input action, if implemented, causes the second object to conflict with the constraint.

* * * * *